United States Patent
Thomas et al.

(10) Patent No.: US 11,330,347 B2
(45) Date of Patent: May 10, 2022

(54) DYNAMICALLY OPTIMIZED STOPPAGE TIME MEDIA CONTENT

(71) Applicant: International Business Machines Corporation, Armonk, NY (US)

(72) Inventors: Donald Thomas, Hopewell Junction, NY (US); Nicholas Zapotoski, New Paltz, NY (US); John R. Dangler, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/853,940

(22) Filed: Apr. 21, 2020

(65) Prior Publication Data
US 2021/0329352 A1    Oct. 21, 2021

(51) Int. Cl.
| H04N 7/10 | (2006.01) |
| H04N 21/845 | (2011.01) |
| G06F 16/48 | (2019.01) |
| H04N 21/442 | (2011.01) |
| H04N 21/81 | (2011.01) |
| H04N 21/2187 | (2011.01) |
| G06F 16/438 | (2019.01) |

(52) U.S. Cl.
CPC ....... H04N 21/8456 (2013.01); G06F 16/438 (2019.01); G06F 16/489 (2019.01); H04N 21/2187 (2013.01); H04N 21/442 (2013.01); H04N 21/812 (2013.01)

(58) Field of Classification Search
CPC .......... H04N 21/8456; H04N 21/2187; H04N 21/442; H04N 21/812; G06F 16/489; G06F 16/438

USPC .......................................................... 725/32
See application file for complete search history.

(56) References Cited

U.S. PATENT DOCUMENTS

| 9,883,211 B2 | 1/2018 | Kumar |
| 11,100,514 B2* | 8/2021 | Dangler ............. G06Q 20/3278 |
| 2004/0133467 A1 | 7/2004 | Siler |
| 2004/0163115 A1 | 8/2004 | Butzer |
| 2008/0215418 A1 | 9/2008 | Kolve et al. |
| 2010/0017820 A1* | 1/2010 | Thevathasan ........ G11B 27/036 725/35 |

(Continued)

OTHER PUBLICATIONS

Ekin et al., "Generic play-break event detection for summarization and hierarchical sports video analysis," 2003 International Conference on Multimedia and Expo. ICME '03. Proceedings (Cat. No. 03TH8698), Baltimore, 2003, pp. 169-172.

(Continued)

*Primary Examiner* — Jefferey F Harold
*Assistant Examiner* — Sahar Aqil Riaz
(74) *Attorney, Agent, or Firm* — Cantor Colburn LLP; Tihon Poltavets

(57) ABSTRACT

Aspects include receiving past performance data. Aspects also include collecting a set of observations about a live event. Aspects also include generating a stoppage time prediction based on the past performance data and the set of observations about the live event. Aspects also include generating an optimized content sequence based on the stoppage time prediction and a respective duration of each of a plurality of preexisting media files. The optimized content sequence includes a sequence of one or more media files of the plurality of preexisting media files.

17 Claims, 7 Drawing Sheets

(56) References Cited

U.S. PATENT DOCUMENTS

| | | |
|---|---|---|
| 2010/0023964 A1 | 1/2010 | Basso et al. |
| 2014/0068662 A1* | 3/2014 | Kumar ................ H04N 21/812 725/34 |
| 2018/0199074 A1* | 7/2018 | Potesta ............... H04N 21/232 |

OTHER PUBLICATIONS

Wan et al., "Advertising Insertion in Sports Webcasts," IEEE MultiMedia, vol. 14, No. 2, Apr.-Jun. 2007, pp. 78-82.

Xie et al., "Structure Analysis of Soccer Video with Domain Knowledge and Hidden Markov Models," Pattern Recognition Letters, vol. 25, No. 7, 2004, pp. 767-775.

* cited by examiner

| Running time | Predicted remaining time | Live action | Remaining entertainment |
|---|---|---|---|
| 0 seconds | 110 seconds - typical inning change | Inning almost ending | |
| 0 seconds | 130 seconds - original prediction (+20 seconds to standard inning change) | End of action, beginning of commercial break | Fill with ads from ad length library: 30+30+30+20+20 second commercials |
| 30 seconds | 100 seconds | No change | 30+30+20+20 second commercials remain (No change) |
| 60 seconds | 75 seconds (+5 seconds to original prediction) | Pitcher slower than originally predicted (+5 seconds) | 30+20+25 second commercials remain (Added 1 + 5 second feature to last 20 second car commercial to take advantage of additional time) |
| 90 seconds | 45 seconds | No change | 20+25 second commercials remain (No change) |
| 120 seconds | 25 seconds (+10 seconds to prior prediction) | Umpire talking to coach (+10 seconds) | 35 second last commercial remaining (Last commercial extended +10 seconds added feature) |
| 135 seconds | 15 seconds (+5 seconds to prior prediction) | Batter slower than predicted (+5 seconds) | 15 seconds of last commercial remains (Additional text of new feature added) |
| 150 seconds | 0 seconds | Return to live action | |

FIG. 2

DYNAMICALLY OPTIMIZED STOPPAGE TIME MEDIA CONTENT

BACKGROUND

The present invention generally relates to computer processing systems, and more specifically, to providing dynamically optimized stoppage time media content.

Televised sporting events often include stoppages in game play that provide an opportunity for broadcasters to display advertisements to viewers. Advertising presented during such live sporting events is a huge market, representing billions of dollars in yearly spend and a large portion of the ad revenue generated by many television (TV) networks. However, many popular televised sporting events, such as baseball, football and basketball can have unexpected delays and stoppages that can occur at irregular times and for uncertain durations. This presents challenges to networks in allocating time to advertisements, as not providing enough advertisements may lead to "dead air" in which the sport has not resumed play, whereas providing advertisements that are too long may cause a viewer to miss some of the gameplay if the game resumes before the commercials have finished airing. In some cases, the gameplay stoppage can be intentionally extended to facilitate the end of a preplanned commercial, however such additional stoppage time disrupts the natural flow of the game and extends the overall time of the game, which can negatively impact a viewer's experience of the live event.

SUMMARY

Embodiments of the present invention are directed to providing dynamically optimized stoppage time media content. A non-limiting example of the computer-implemented method includes receiving past performance data. The method also includes collecting a set of observations about a live event. The method also includes generating a stoppage time prediction based on the past performance data and the set of observations about the live event. The method also includes generating an optimized content sequence based on the stoppage time prediction and a respective duration of each of a plurality of preexisting media files. The optimized content sequence includes a sequence of one or more media files of the plurality of preexisting media files.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 illustrates an example of dynamically modifying a stoppage time predication and an optimized content sequence based on observations of a live event according to one or more embodiments of the present invention;

Figure 1:
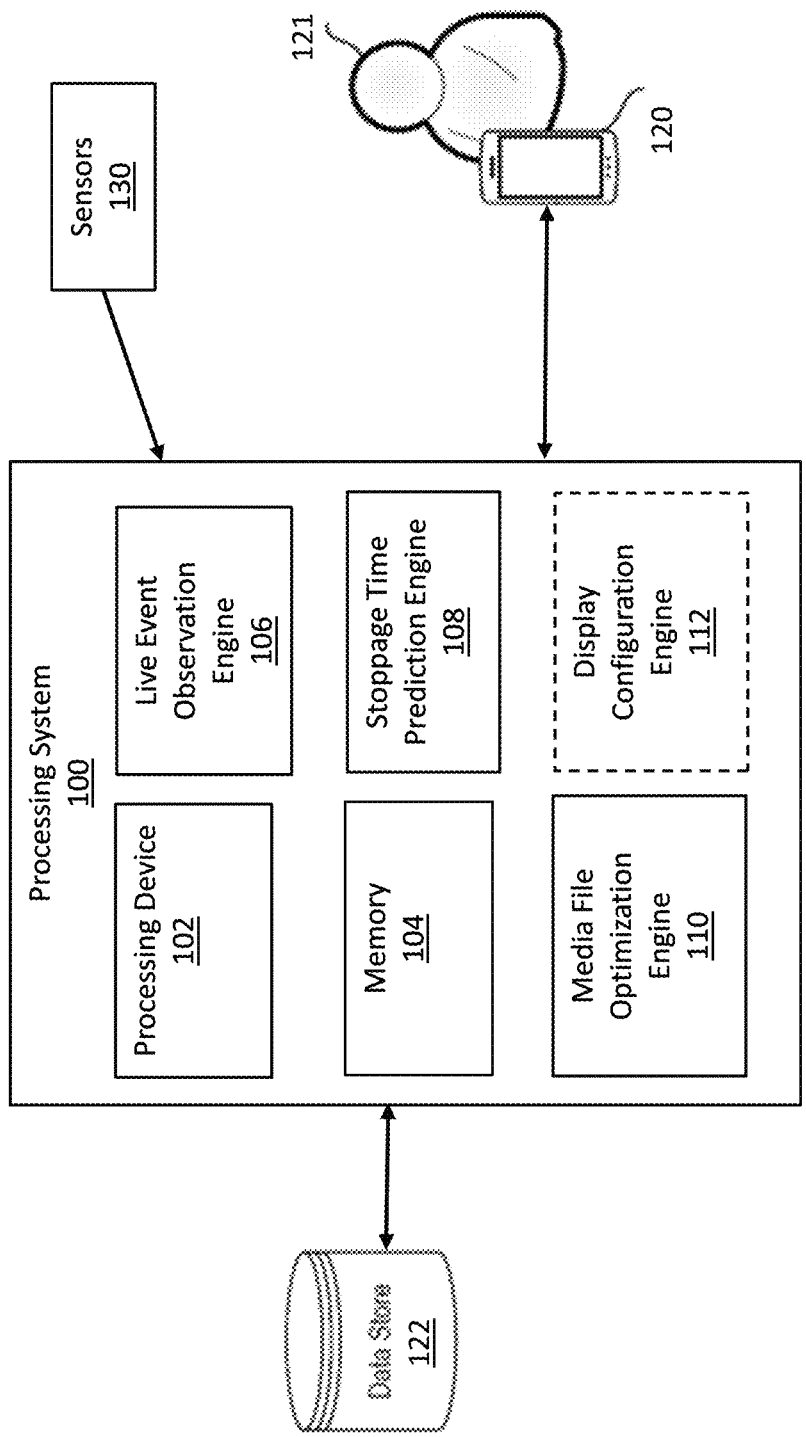
FIG. 1 depicts a system upon which providing dynamically optimized stoppage time media content may be implemented according to one or more embodiments of the present invention.

The diagrams depicted herein are illustrative. There can be many variations to the diagrams or to the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide dynamically optimized stoppage time media content for display to a viewer of a broadcast live event during a stoppage of the event. Such broadcasts can be made over cable television (TV), satellite feeds, streaming over the Internet, or any other such known method of broadcasting a presentation of a live event, such as a sporting event. Embodiments of the invention can identify a stoppage in the live event (e.g., a time out), determine a critical path for the stoppage time, and dynamically predict the duration of the stoppage time based on historical data and observed data obtained from real time monitoring of the live event. Based on the stoppage prediction, embodiments of the invention can determine a sequence of media files (e.g., TV commercials) to broadcast to the viewer during the stoppage time that are selected to closely match the expected stoppage time. In this way, a viewer can be presented with a series of media files during the stoppage of the live event in a manner such that the series of media files will cease playing at the approximate time that the stoppage naturally ceases and the live event continues. In this way, additional stoppage time that may conventionally be artificially inserted into a broadcast to allow a planned run of media files to play to the viewers can be rendered unnecessary, thereby allowing the live event to proceed at its natural pace while reducing the overall duration of the live event and still effectively presenting information included in the media files to the viewers.

One or more embodiments of the present invention address one or more shortcomings of the prior art by monitoring the event during the stoppage time and dynamically adjusting the predicted duration of the stoppage time based on the live actions that are occurring. For example, if a stoppage is occurring during a baseball game to allow a grounds crew to rake the dirt and otherwise clean up the field, embodiments of the invention can monitor the progress of the grounds crew and may determine that they are performing their clean up tasks faster or slower than expected. Based on this determination, the expected duration of the stoppage time can decreased or increased on the fly, and embodiments of the invention can make one or more adjustments to the content sequence (e.g., the selected sequence of media files) to adjust the overall duration of the content sequence to meet the newly determined stoppage time prediction. In one or more embodiments of the invention, the system can dynamically make adjustments to a particular media file of the content sequence to adjust the duration of the particular media file in order to adjust the overall duration of the content sequence. For example, in some embodiments, the system can trim or add a portion of the run time of the media file (e.g., add or delete one or more frames of a video), can slow down or speed up a portion of the run time of the media file (e.g., slow down or speed up a portion of a video), or can dynamically alter the presentation of or more content elements of the media file to the user to reduce or expand the run time of the media file (e.g., combine elements of a first set of frames of a video with elements of a second set of frames of the video). The dynamic optimization of the stoppage time media content can provide technical benefits of providing dynamic adjustments to the stoppage time media content to eliminate the need for unnatural extensions of stoppage time during a live event to accommodate the run time of the content sequence of media files. Embodiments of the invention provide benefits of speeding up a live sporting event, improving the transition between advertisements and the live event and reducing unnatural delays for advertising to facilitate the natural flow of a sporting event and improve viewer experience.

Turning now to FIG. 1, a processing system 100 for providing dynamically optimized stoppage time media content is generally shown in accordance with one or more embodiments of the present invention. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device 102 for executing those instructions. Thus, a system memory (e.g., memory 104) can store program instructions that when executed by the processing device 102 implement the engines described herein. Other engines can also be utilized to include other features and functionality described in other examples herein.

The processing system 100 shown in FIG. 1 includes the processing device 102, the memory 104, a live event observation engine 106, a stoppage time prediction engine 108, a media file optimization engine 110 and can optionally include a display configuration engine 112. The processing system 100 can be configured to communicate with a user device 120, which may display receive a broadcast signal and display the content of a sequence of media files to a user 121, a data store 122 and one or more sensors 130 configured to obtain readings and observations of activities and occurrences at the live event. User device 120 can be, but is not limited to being, a be a television, a computer, a tablet, a smartphone, an augmented or virtual reality device, a radio, a headset, speakers or any other such device that can be used to receive and display audio and/or video of live events, such as sporting events. Although FIG. 1 depicts the user device 120 receiving a signal from the processing system 100, it will be appreciated that in various embodiments, one or more intermediate devices can be utilized to transmit the content of the sequence of media files to user device 120, such as a satellite broadcasting station, cable or internet service provider equipment, a Wi-Fi router, a cell tower or any other such device used to broadcast or stream a live audio and/or video signals to a display device. According to one or more embodiments, the processing system 100 may communicate with user device 120, data store 122 and/or sensors 130 via a communications network that may be one or more of, or a combination of, public (e.g., Internet), private (e.g., local area network, wide area network, virtual private network), and may include wireless and wireline transmission systems (e.g., satellite, cellular network, terrestrial networks, etc.).

According to one or more embodiments of the present invention, data store 122 can store past performance data that may be relevant to making predictions about the duration of a stoppage event. For example, with respect to baseball, data store 122 can store historical data for various stoppage time events, such as durations for raking the dirt, cleaning the field, covering or removing a tarp from the field, teams switching between offense and defensive positions, new pitchers being called up and warming up, conferences called on the field by a team, attending to injuries, attending to equipment failures, dealing with errant animals or fans on the field, the occurrence of a fight between players or any other such type of activity that can result in a stoppage of play. The stored data may indicate the location (e.g., which stadium) the data was taken at, the conditions (e.g., time of day, weather conditions, day of the week, etc.), the individuals involved (e.g., who was on the grounds crew, which teams/players were involved, which umpires present). Thus, for example, the stored data may indicate that a first grounds crew typically cleans the field in 20 seconds, whereas a second grounds crew typically takes 25 seconds to clean the field. Similarly, the stored data may indicate that a first umpire typically limits a new pitcher's warm up period to one minute whereas a second umpire typically allows a new pitcher to warm up for three minutes. The foregoing are merely illustrative examples and it will be understood that it is contemplated that the data store 122 (or other storage devices that may be accessed by processing system 100) can store any type of historical data that could be used to assist in making predictions about how long one or more activities performed during a stoppage in game play are likely to take.

The live event observation engine 106 receives signals from one or more sensors 130 disposed at locations configured to allow the sensors 130 to obtain readings from the event. For example, sensors 130 can include one or more image capture devices (e.g., digital video cameras) and/or microphones disposed at the venue hosting the live event. In some embodiments, sensors 130 can include biometric devices disposed on one or more players, coaches, referees and/or umpires. According to some embodiments, sensors 130 can include other devices for obtaining environmental data, such as temperature data, brightness, wind, humidity, rainfall, water content of a field or other such environmental information that could impact the duration required for an activity to be performed. For example, if a baseball field is wet and/or the sun particularly bright and is at an angle makes it more difficult to see clearly, it may take a grounds crew longer than it typically would to perform a task such as resetting the infield.

The observation engine 106 interprets the data received from the sensors to identify and track what activities (e.g., cleaning the field, warming up a new pitcher, the switching offense/defense, etc.) are occurring at the venue. In some embodiments, the sensors can be augmented by a stand-alone system such as augmenting standard video feeds (e.g., video feeds that are always trained on the bases in a baseball game) with additional videos feeds from cameras at the venue. As will be understood by those of skill in the art, observation engine 106 can include and/or utilize known cognitive systems and/or one or more various machine learning models to interpret visual data (e.g., obtained from one or more cameras) to understand the activities that are occurring. For instance, based on image data received from one or more cameras disposed at a baseball stadium and using machine learning techniques for image recognition and/or object classification and/or a cognitive system configured to analyze and interpret visual data, the observation engine 106 can determine an activity or occurrence that is happening at the venue, such as recognizing that a grounds crew is in the process of resetting the infield after the seventh inning stretch, that a new pitcher is warming up at the plate, that a team conference is taking place on the field, or any other such activity that gives rise to a stoppage of play. One or more models can continuously compare observations of individual segments (e.g., the behavior of each individual player) against a prediction and update the prediction based on the comparison. The cognitive system can continuously compare predictions to actual outcomes and identify ways to make better predictions, especially in cases where prior historical data is not available or known.

According to one or more embodiments, the live event observation engine 106 can receive data from a third-party source that can be used to provide context that can aid in identifying the activity that is occurring. For example, live event observation engine can receive information about the number of balls, number of strikes, number of outs, number of innings, identification of the players at each position and which players are at bat/on deck, identification of the umpires, or other such information from, for example, a server run by the league or by a broadcaster that is tracking various elements of the event. Thus, for example, if the live event observation engine 106 knows it is currently the seventh inning stretch, the live event observation engine 106 will know that an infield reset is typically performed at this time and it should therefore be monitoring the scene to detect the presence of an infield reset activity.

According to one or more embodiments of the present invention, the observation engine 106 can utilize facial recognition or other forms of object identification (e.g., identifying the name or number on a player's jersey) to identify particular players, coaches, umpires, referees, grounds crew members, and any other such individuals that may be participating in stoppage time activities at an event. In some embodiments, the observation engine 106 can determine a state of an activity, such as whether one or more sub-tasks of an activity have been completed and/or an estimated of the overall completion of an activity based on known sub-tasks of an activity and/or a comparison to past performance data of activity. For example, if the live event observation engine 106 determines that an activity of changing out all of the bases is occurring, the live event observation engine 106 may know that this activity involves changing out the first, second and third bases and so the live event observation engine 106 can determine that, for example at various stages of the activity, a first base has been changed out, a first and a second base has been changed out or a first, second and third base have been changed out. Similarly, in some embodiments, live event observation engine 106 could determine an estimate of the percentage completion of the activity (e.g., the grounds crew is 60% complete at the activity of changing out the bases).

The stoppage time prediction engine 108 makes predictions about the duration of a stoppage time based on the activities identified by the observation engine 106 and stored past performance data. According to some embodiments, the stoppage time prediction engine 108 can predict the duration of the stoppage time by identifying a critical path and estimating the duration of the critical path. As will be appreciated, during a stoppage time of an event there may be multiple sequences of activities that may need to occur prior to the end of the stoppage time and the critical path refers to the sequence or group of actions/sub-tasks of an activity that is expected to have the longest duration for completion. For example, during an inning change in a baseball game, the live action of the game stops and there may be several sequences or groups of actions that may have to occur prior to the game resuming, such as for example one or more or of: the present defensive players leaving the field, the new defensive players taking the field, a new batter coming to the plate, grounds crew tasks, a new pitcher warming up, and other such sequences or groups of activities. Each such activity can include many actions or sub-tasks that may or may not have to occur in sequence. For example, the activity of the new defensive players taking the field includes sub-tasks of each individual player having to take their respective position on the field and can include sub-tasks of the players throwing a ball around to warm up and/or a new pitcher throwing a number of warm up pitches. The stoppage time prediction engine 108 can identify one or more separate sequences or groups of actions or activities (each of which may be referred to as a separate "path") that must occur before the live event will resume based on the observed activities and other known data (e.g., past performance data and/or stored data indicating the sub-tasks of a particular activity) and determine an estimate of the duration of each path. The critical path is the path having the longest estimated duration for completion. The stoppage time prediction made by the stoppage time prediction engine 108 corresponds to the estimated duration of the critical path.

The stoppage time prediction engine 108 can utilize cognitive analytics to make a prediction about the duration of a stoppage time by analyzing a multitude of factors and actions occurring at the live event. By way of example, in the context of a baseball game, the stoppage time prediction engine 108 may analyze factors such as individual player patterns (e.g., whether an outfielder runs or walks in and out from outfield, typical length of a particular pitcher's warmup, etc.), referee/umpire patterns, normal game factors, current and predicted weather, in stadium actions (e.g., promotions, maintenance activities such as shoveling off ice or raking the infield) and injury time outs. In various sports, normal game factors can include taking a first down measurement, a catcher being up to bat next (which can take more time to change out of catcher's gear), a pitching change, conferences on the mound, team time outs, teams strategically affecting the pace of a game (e.g., a coach asking for a measurement) and video reviews/challenges. With respect to injury time outs, the stoppage time prediction engine 108 can estimate a stoppage due to injury by using cognitive analysis to determine the type and/or severity of an injury by identifying the source of the injury (e.g., head, arm, leg, etc.), whether player assistance is needed (e.g., the involvement of other players, a trainer and/or medical personnel/cart) and by comparing the apparent injury to previous similar injuries. It will be understood that the foregoing is merely exemplary and it is contemplated that any other perceivable action or piece of information that may be relevant to estimating a stoppage time can be used by the stoppage time prediction engine 108.

According to some embodiments of the present invention, the duration of each action/sub-task of an activity path can be estimated by the stoppage time prediction engine 108 based on the past performance data to determine a total estimated duration of the path. For example, for the activity of changing out the bases in a baseball game, the past performance data may indicate that on average it takes 12 seconds to change first base, 8 seconds to change second base and 8 seconds to change third base, for an expected total duration of 28 seconds to complete this activity path. The stoppage time prediction engine 108 can dynamically modify estimates of a duration of a path based on the real-time observations of the live event. For example, if the estimated duration to change the bases based on past performance data is 28 seconds, the stoppage time prediction engine 108 may maintain an estimated prediction of 28 seconds following an observation that the first base was changed in 12 seconds, however, if for example, a grounds crew member trips and falls on the way to second base and this adds 3 seconds to the changing of the second base, the stoppage time prediction engine 108 can dynamically revise the estimated duration of the path to be 31 seconds to account for the additional unexpected 3 seconds.

Thus, in some embodiments, the stoppage time prediction engine 108 can revise the estimated duration based on an observed deviance from an expected performance time of an action/sub-task of the activity. In some embodiments, the stoppage time prediction engine 108 can revise the estimated duration of the path prior to the completion of the sub-task by predicting a deviance in duration based on observations of the live event. For example, instead of waiting the 3 seconds to observe the grounds crew member who tripped get back on their feet, the stoppage time prediction engine 108 may predict an increase of 3 seconds upon the grounds crew member initially tripping and can additionally revise the estimate of the path duration again later if necessary based on the observed difference (e.g., if the difference actually ends up being 5 seconds the estimate can be modified again at this point). In this way, in some embodiments, the stoppage time prediction engine 108 can dynamically revise and update estimates of a duration of the completion of an activity path based on observations about the live event.

The media file optimization engine 110 selects a sequence of one or more media files from a plurality of preexisting media files for presentation during the stoppage time by, for example, broadcasting the content of the media files to viewing devices of one or more users during the stoppage of the live event (e.g., inserting a commercial break into the broadcast of the live event during the stoppage). Media files can be pre-recorded audio/visual files, such as advertisements that would conventionally be shown on broadcast television or through streaming video on the internet. Each media file can have an associated run time duration that indicates the amount of time it takes to play the media file from start to finish without alteration. According to some embodiments, the media file optimization engine 110 selects the sequence of one or more media files based on the stoppage time prediction generated by the stoppage time prediction engine 108 such that the total duration of the sequence of selected media files is approximately equal to the duration of the stoppage time prediction (which may be referred to as an "optimized content sequence").

Thus, for example, if the stoppage time prediction is 40 seconds, the media file optimization engine 110 may select three media files to play during the stoppage that respectively have durations of 15 seconds, 15 seconds and 10 seconds. As will be appreciated, it is desirable that the duration of the sequence of media files matches the duration of stoppage time so that the content of the media files can efficiently be presented to viewers of the live event during the stoppage of the event, without unnaturally extending the duration of the stoppage or missing some of the live action due to the duration of the sequence of media files extending beyond the duration of the stoppage time. According to some embodiments, the order of the sequence may be selected based on the duration of each media file of the sequence (e.g., placing them in order from longest duration to shortest duration) or other factors such as the relative importance of each media (e.g., in order of most important to least or placing the least important media files in the middle of the sequence) as indicated by predetermined importance rankings. In some embodiments, the media file optimization engine 110 may not select any media files to broadcast unless the stoppage time prediction exceeds a minimum threshold duration. Thus, for example, if stoppage time prediction is only 4 seconds, the system may simply continue to broadcast the event during the stoppage instead of attempting to broadcast a sequence of one or more media files having a total duration of 4 seconds to prevent excessively short jarring interruptions to the live event broadcast.

As described above, the stoppage time prediction can be dynamically modified by the stoppage time prediction engine 108 based on observations of the live event. Similarly, the media file optimization engine 110 can also dynamically modify the optimized content sequence to alter the total duration of the optimized content sequence to match the modified stoppage time prediction. For example, in some embodiments, if the predicted stoppage time increases, the media file optimization engine 110 can modify the optimized sequence to approximately match the duration of the new predicted stoppage time by adding one or more new media files to the optimized sequence and/or replacing a media file of the optimized sequence that has not yet been played/broadcast as part of the sequence with another media file having a longer duration. Similarly, the media file optimization engine 110 can remove or replace media files of the optimized sequence if the stoppage time prediction is modified to be shorter than originally expected.

According to one or more embodiments of the present invention, in response to a revised stoppage time prediction, the media file optimization engine 110 can dynamically alter one or more media files of the optimized content sequence to change the duration of the media file to lengthen or shorten the duration of the media file in order to adjust the duration of the optimized content sequence to match the revised stoppage time prediction. It will be understood that references to changing the duration of the media file refers to changing the duration of a video (or other media such as audio-only files) that is represented by the media file. In some embodiments, the media file optimization engine 110 can dynamically alter a media file to change the duration of the media file by adding or removing one or more of a plurality of predetermined segments of the media file. In other words, in some embodiments, a media file can be made up of a plurality of predetermined segments that can be selectively removed or added without losing the meaning of the media file.

For example, if a media file is an advertisement for a car dealership, the media file may include 1 8-second segment about general information about the dealership and 4 3-second segments about current pricing offers on 4 specific types of vehicle. In this case, the media file optimization engine 110 can select (by adding or removing) a number of the 4 vehicle advertisement segments to include with the broadcast in order to optimize the content sequence. For example, if the media file optimization engine 110 initially selects to include 3 of the vehicle advertisement segments for inclusion with the 1 general information segment to correspond to the initial stoppage time prediction, but the stoppage time prediction is revised to be 3 seconds longer than originally predicted, the media file optimization engine 110 can dynamically alter the media file to include the 4$^{th}$ previously unselected 3-second vehicle segment. Similarly, the media file optimization engine 110 can dynamically remove one or more media segments if the stoppage time prediction is modified to be less than originally predicted.

In some embodiments, the media file optimization engine 110 can dynamically alter a media file to change the duration of the media file by slowing down or speeding up all or a portion of the run time of the media file to meet the revised stoppage time prediction. As will be appreciated by those of skill in the art, the rate at which videos are shown is typically measured in frames per second and thus the duration of a video clip can be determined by the total number of frames divided by the frame rate. According to some embodiments, the media file optimization engine 110 can modify the total duration of a media file by increasing or decreasing a frame rate at which a portion of the video of is played to respectively decrease or increase the duration of the media file. In some embodiments, certain videos or portions of videos can be more amenable to having adjusted frame rates. For example, a video of a car driving around can be easily sped up or slowed down without negatively impacting the substance of the video. According to some embodiments, such portions of the video may be previously designated by a user or determined by the cognitive system.

In some embodiments, the media file optimization engine 110 can dynamically alter a media file to change the duration of the media file by dynamically reorganizing the format and/or content of a video represented by the media file. In some embodiments, an advertisement (e.g., a TV commercial) represented by the media file may be computer generated such that elements of the advertisement can be quickly and easily reorganized, rearranged and/or reformatted. In some embodiments, the media file optimization engine 110 may identify one or more frames of a video that contain text and may reduce the duration of the media file by superimposing the text on a portion of one or more other frames of the video and deleting the original frames containing the text. For instance, a commercial for a car dealership may include frames at the end of the commercial that display the phone number and or address of the car dealership and the media file optimization engine 110 may delete those frames from the video but superimpose the phone number/address over another portion of the video. In this way, the duration of the video can be reduced while maintaining important information contained within the video.

According to some embodiments, one or more media files can be designated as being an "exit ready" media file, which means that the media content (e.g., a video advertisement) represented by the media file can be cut off before it has concluded its original run time without losing the substance or meaning of the file. For example, a particular video advertisement may repeat the same sequence of frames multiple times, such that if the sequence is only played once or twice and then the advertisement is cut off, the meaning of the advertisement is still be conveyed to the viewers. In some embodiments, the media file optimization engine 110 can place an exit ready media file at the end of an optimized content sequence to allow for the playing of the optimized content sequence to be abruptly cut short should the live action of the event unexpectedly resume before the end of the predicted stoppage time. According to some embodiments, upon receiving an indication that the live event has resumed (e.g., via user input) or upon detecting that the live event has resumed (e.g., via live event observation engine 106), the processing system may cause a display of the optimized content sequence (e.g., the playing of an exit ready media file) to cease and a display of the broadcast of the live event to resume.

Although embodiments with various techniques for increasing or decreasing the duration of a media file are described above, it will be understood that it is contemplated that in some embodiments, the media file optimization engine 110 may perform one, all, or a combination of such techniques as necessary. Thus, in the previous example, if the stoppage time prediction is reduced by 20 seconds, the media file optimization engine 110 may dynamically modify an optimized content sequence by removing a 15-second media file from the sequence, modifying a first media file of the sequence to remove a 4-second segment and increasing the frame rate of a second media file to reduce its run time by 1 second in order to achieve the corresponding 20 second reduction. All of the examples provided herein are for illustrative purposes only and are not intended to be limiting in any way.

FIG. 2 shows a table that provides an example of how the processing system 100 can generate a stoppage time prediction for a baseball game, determine an optimized content sequence of advertisements to play during the game stoppage and dynamically modify the optimized content sequence based on collecting observations of the live event. In this example, the past performance data indicates that a typical inning change takes 110 seconds, however the stoppage time prediction engine 108 determines that in this case the inning change will take 20 seconds longer (for a total of 130 seconds) than what is typical because of some observation of the live event (e.g., the condition of the field has been causing players to move more slowly than normal). Based on this initial stoppage time prediction, the media file optimization engine 110 selects a sequence of media files having respective durations (in seconds) of 30, 30, 30, 20 and 20, for a total of 130 seconds. The first commercial plays for 30 seconds and there is no change to the predicted stoppage time based on the observed actions on the field. The next 30 second commercial plays, and during this time the live event observation engine 106 determines that the pitcher is moving slower than normal, causing the stoppage time prediction engine 108 to add 5 seconds to the prediction of remaining stoppage time. In response to the modified stoppage time prediction, the media file optimization engine 110 adds a 5 second segment to the end of the last commercial. The next 30 second commercial plays and there is no change to the stoppage time prediction. The first 20 second commercial plays and completes and the second 20 second commercial begins to play at which point the live event observation engine 106 determines that the umpire is unexpectedly talking to a coach, which results in the stoppage time prediction engine 108 adding 10 seconds to the stoppage time prediction and the media file optimization engine 110 adding a 10 second segment to the end of the last commercial. The last commercial continues to play and the live event observation engine 106 determines that the batter is moving more slowly than expected, causing the stoppage time prediction engine 108 to add a further 5 seconds to the stoppage time prediction and the media file optimization engine 110 to modify the last commercial to generate 5 seconds worth of additional video frames that display text of features of the products shown in the commercial. After 150 seconds have elapsed, the live action in the baseball resumes just as the last advertisement is finished playing to the audience. In this way, embodiments of the invention can provide a content sequence that is dynamically optimized to finish playing at approximately the same time (e.g., within one second) as the live action of the event resumes.

Referring back to FIG. 1, the display configuration engine 112 can generate a combined video feed that includes a feed of the live event and a feed of the sequence of media content so that they can both be viewed at once, for example, as an alternative to simply cutting off the feed of the live event during the entire run of the optimized content sequence. According to some embodiments, this may be done in an instance where although the live action has not resumed, what is occurring at the event may be considered to be important such that viewers may be interested in seeing it. For example, if a player tripped and injured himself during the stoppage time and medical staff have come on to the field to evaluate the player, while it is not game action it may nonetheless be action that is of viewing interest to the audience. Accordingly, in some embodiments, the display configuration engine 112 can determine an importance of one of more actions or activities occurring at the live event during the stoppage time and if the importance exceeds a predetermined threshold, the display configuration engine may cause the feed live event to be displayed simultaneously with the feed of the optimized media content, using, for example, a split screen configuration, a picture-in-picture configuration or any other such suitable configuration for viewing two video feeds at the same time. In some embodiments, the importance of an event can be determined based on historical data and other available data. For example, player rankings and/or game rankings may be available and used by the system to determine the importance of an action or activity.

According to some embodiments, the ratio of the sizes of the two displays can depend on the determined importance of the live event and/or the timing relative to the start/end of the stoppage time. For example, if the live action is determined to be very important, it can be displayed as a full screen with the optimized content sequence being displayed in a smaller picture-in-picture screen. If the live action is determined to be important but not of high importance, then the live event feed can be displayed as a smaller picture-in-picture screen within a full screen display of the optimized content sequence. Further, in some embodiments, a display of the optimized content sequence may be much more prominent than the display of the live event, but as the end of the stoppage time draws closer the ratio may change such that the display of the live event is much larger than the display of the optimized content sequence right before the live event resumes. According to some embodiments, the determination to present a combined video feed and/or the ratio between the sizes of the two video feeds can be determined and changed dynamically based on the iterative determinations of the importance of the live action.

According to some embodiments, the display configuration engine 112 can serve to integrate a desired lead in time by an announcer. For example, if a game announcer desires to show a replay of a play that occurred prior to the stoppage time and provide commentary on the play, the display configuration engine 112 can provide a combined video feed of the replay and/or announcer along with the optimized content sequence. According to some embodiments, processing system 100 can receive a user input (e.g., directly received by processing system 100 or transmitted to processing system by, for example, a TV studio production server) indicative of an announcer's desire to have a specified amount of air time. In some embodiments, the media file optimization engine 110 can receive this indication and insert the announcer feed into the optimized content sequence (e.g., by replacing or reducing the duration of one or more other media files) such that the announcer's feed will be broadcast at the end of for example, a series of TV commercials, but prior to the live event resuming. In some embodiments, instead of being inserted into the optimized content sequence, the announcer feed can be displayed in a combined video feed as described above.

Figure 3:
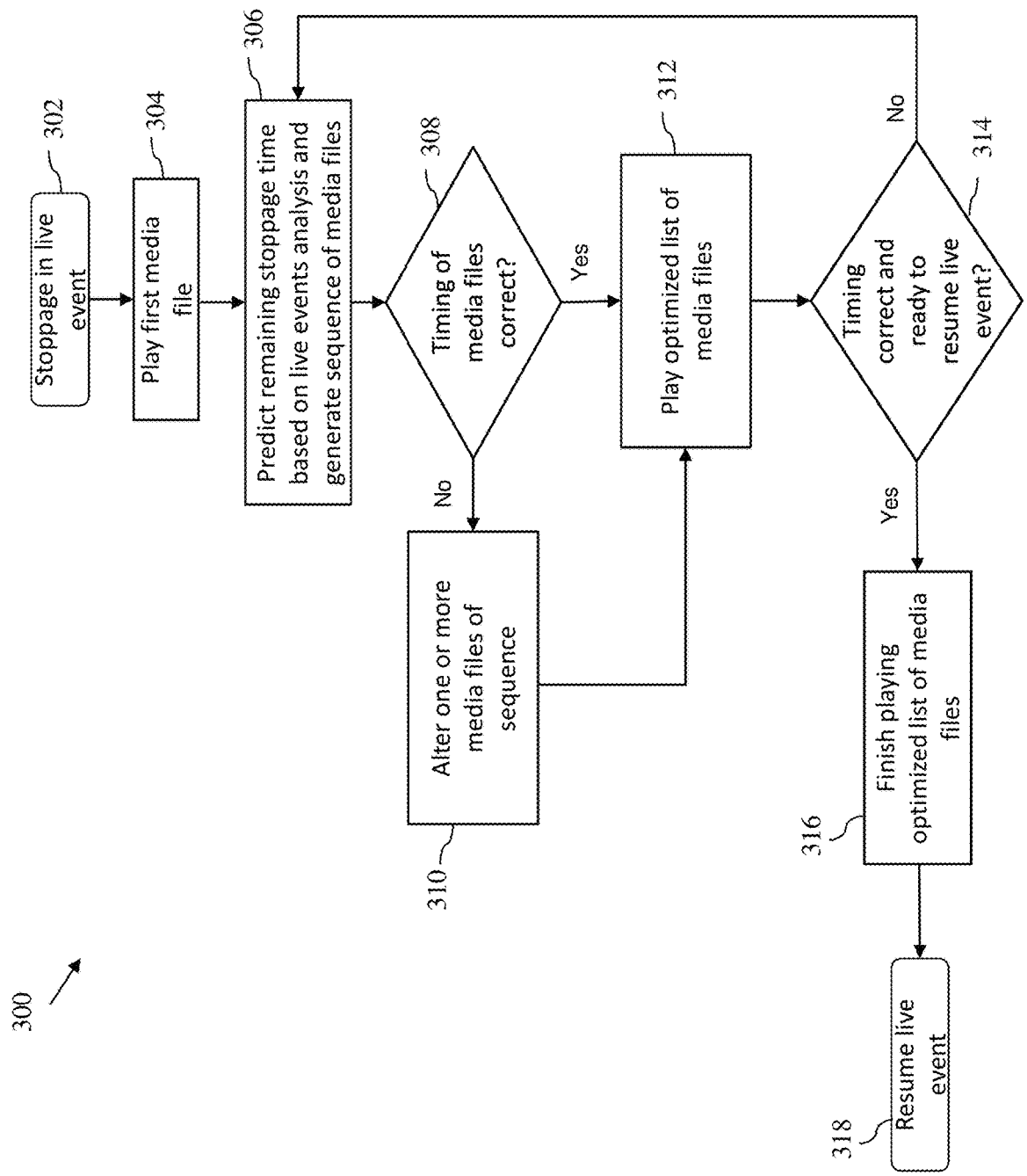
FIG. 3 illustrates a flow diagram of a process for providing dynamically optimized stoppage time media content in accordance with one or more embodiments of the present invention.

Turning now to FIG. 3, a flow diagram of a method 300 for providing dynamically optimized stoppage time media content in accordance with an embodiment is shown. In one or more embodiments of the present invention, the method 300 may be embodied in software that is executed by computer elements located within a network that may reside in the cloud, such as the cloud computing environment 50 described herein above and illustrated in FIGS. 5 and 6. In other embodiments, the computer elements may reside on a computer system or processing system, such as the processing system 100 or the processing system 700 described herein above and illustrated in FIGS. 1 and 7, or in some other type of computing or processing environment.

The method 300 begins at block 302 and includes determining (e.g., via processing system 100) a stoppage in a live event. For example, in some embodiments, live event observation engine 106 may determine that a stoppage has occurred based on an analysis of observations obtained about the live event from sensors 130. For example, in the context of a baseball game, live event observation engine 106 may know that there are two outs and may observe an outfielder catch a fly ball, in which case live event observation engine 106 can determine that a third out has been achieved by the defense and the game will now stop to switch offensive and defensive sides. In some embodiments, a determination of the stoppage in the game may be manually triggered by, for example, a television producer.

As shown at block 304, the method includes playing (e.g., via a user device 120) a first media file. According to some embodiments, processing system 100 may cause the user device 120 to begin playing a first media file by causing the first media file to be broadcast, streamed, or otherwise communicated to user device 120 (e.g., in response to a determination that a stoppage has occurred or in response to a manual triggering of the stoppage by a producer. According to some embodiments, the first media file can be predetermined and may begin playing without a predetermined sequence of media files designated to play after it.

As shown at block 306, the method includes predicting (e.g., via processing system 100) a remaining stoppage time based on live events analysis and generating a sequence of media files. For example, as described above, the stoppage time prediction engine 108 can determine a stoppage time prediction by determining the duration of a critical path of actions occurring at the live event during the stoppage and the media file optimization engine 110 can select a sequence of one or more media files to play after the first media file such that the total duration of all of the played media files will be equal to the duration of the predicted stoppage time.

As shown at block 308, the method includes determining (e.g., via processing system 100) whether the timing of the media files is correct. In other words, the processing system 100 determines whether the total duration of the selected sequence of media files matches the predicted stoppage time duration. If it does not, the method proceeds to block 310, where the method includes altering (e.g., via processing system 100) one or more of the media files of the sequence. For example, the media file optimization engine 110 can shorten or length the duration of the sequence of media files using various techniques described above. If the duration of the selected sequence of media files is approximately equal to the duration of the predicted stoppage time, the method proceeds to block 312, where the method includes playing the optimized list of media files. In other words, after the current media file is finished playing, the next media file in the sequence media files will begin playing.

As shown at block 314, the method includes determining (e.g., via processing system 100) whether the timing of the optimized list of media files is correct and whether the live event is about to resume. If either of those are not true, the method returns to block 306, wherein the system makes an updated stoppage time prediction and modifies the media content sequence if necessary. In this way, the system iteratively checks the duration of the sequence of the media files against the expected stoppage time and makes revisions to both as necessary until the timing of the sequence of media files is correct and the live event is about to resume (i.e., the live event is expected resume at the conclusion of the currently playing media file), at which point the method proceeds to block 314, where the method includes finishing playing the optimized list of media files at block 316. As shown at block 314, the method includes resuming the broadcast of the live event at block 318. In this way, method 300 allows for a content sequence to be dynamically optimized such that the sequence of media files will finish playing at the time the live event is expected to naturally resume.

Figure 4:
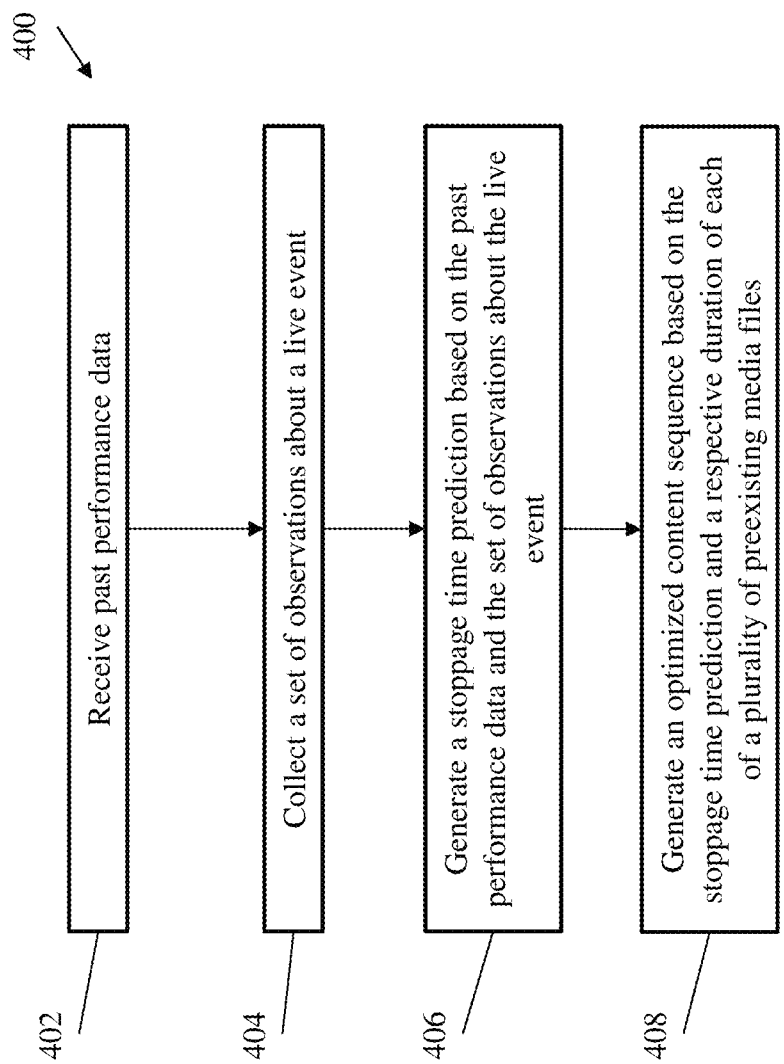
FIG. 4 illustrates a flow diagram of another process for providing dynamically optimized stoppage time media content in accordance with one or more embodiments of the present invention.

Turning now to FIG. 4, a flow diagram of another method 400 for providing dynamically optimized stoppage time media content in accordance with an embodiment is shown. In one or more embodiments of the present invention, the method 400 may be embodied in software that is executed by computer elements located within a network that may reside in the cloud, such as the cloud computing environment 50 described herein above and illustrated in FIGS. 5 and 6. In other embodiments, the computer elements may reside on a computer system or processing system, such as the processing system 100 or processing system 700 described herein above and illustrated in FIGS. 1 and 7, or in some other type of computing or processing environment.

The method 400 begins at block 402 and includes receiving (e.g., via processing system 100) past performance data. For example, in some embodiments, past performance data can be stored by data store 122 or other storage locations.

As shown at block 404, the method includes collecting (e.g., via processing system 100) a set of observations about a live event. As described above, sensors 130 can be disposed about a venue (e.g., a baseball stadium) in which a live event is occurring and can obtain images, video, sound and other such data from any desired portion of the venue in which actions can occur that may impact a duration of a stoppage of an event.

As shown at block 406, the method includes generating (e.g., via processing system 100) a stoppage time prediction based on the past performance data and the set of observations about the live event. For example, stoppage time prediction engine 108 can determine a stoppage time prediction as described previously above. For example, a stoppage time prediction can be determined in part by modeling expected activities, comparing the live action to the expectations and updating the prediction based on the comparison to track an activity and determine an overall deviance from the expected duration of the activity. According to some embodiments, generating a stoppage time prediction can include identifying one or more stoppage delay paths, determining a critical path based on the one or more stoppage delay paths, and estimating a duration of the critical path. As will be appreciated by those of skill in the art, such estimates can be made using cognitive data analytics and/or machine learning techniques.

As shown at block 408, the method includes generating (e.g., via processing system 100) an optimized content sequence based on the stoppage time prediction and a respective duration of each of a plurality of preexisting media files. The optimized content sequence is a sequence of one or more media files of the plurality of preexisting media files. According to some embodiments, generating the optimized content sequence includes selecting the one or more media files such that a total duration of the one or more media files matches a duration of the stoppage time prediction, as described previously above.

According to some embodiments, the method 400 can further include causing (e.g., via processing system 100) the one or more media files to be displayed by a display device. For example, processing system 100 can cause the content of the media files to be broadcast over a cable television signal for viewing on a television, to be streamed online for viewing via the internet, or to be otherwise transmitted or broadcast for reception and display by a user device 120.

In some embodiments, the set of observations are a first set of observations about the live event collected at a first time and the method 400 further includes collecting a second set of observations about the live event at a second time, wherein the second time occurs after the first time, generating a revised stoppage time prediction based on the second set of observations about the live event and the past performance data and revising the optimized content sequence based on the revised stoppage time prediction. In other words, the sensors 130 can be continually or intermittently gathering sensor data observations of actions that are occurring at the live event that can be used by processing system 100 to determine whether changes should be made to the optimized content sequence to account for changes to the predicted stoppage time. In some embodiments, revising the optimized content sequence can include adjusting a duration of a selected media file of the one or more media files. Adjusting the duration of the selected media file can include adding or removing one or more of a plurality of predetermined segments of the media file.

According to some embodiments of the present invention, adjusting the duration of the selected media file can include slowing up or speeding down a portion of the selected media file. For example, the speed (e.g., frame rate) of a portion of a video can be sped up or slowed down. In some embodiments, adjusting the duration of the selected media file can include generating a new frame of the selected media file that combines a first visual element from a first frame of the selected media file with a second visual element from a second frame of the selected media file and removing the first frame and the second frame from the selected media file. In other words, in some embodiments, processing system can combine visual elements of two separate portions (i.e., groups of video frames) of a video into a new portion of the video and delete the original two portions. For example, text from one portion of the video can be superimposed on an image from another portion of the video to create the new frames. In this way, the processing system can reduce the duration of a video represented by the media file by deleting some portion of it while still maintaining the content of the deleted portion.

According to some embodiments, method 400 can further include causing (e.g., via processing system 100) a display device (e.g., user device 120) to cease a display of the live event and display the one or more media files in response to determining that a duration of the stoppage time prediction is greater than or equal to a predetermined threshold duration and refraining from causing the display device to cease the display of the live event in response to determining that a duration of the stoppage time prediction is less than the predetermined threshold. In other words, in some embodiments, the processing system 100 may determine whether the expected stoppage time meets a minimum duration before playing a sequence of media files. As will be appreciated, commercial breaks that occur too frequently or for very short durations of time may be annoying to some viewers. In some embodiments, the predetermined threshold can be set by a user of processing system 100.

Additional processes may also be included. It should be understood that the processes depicted in FIGS. 3 and 4 represent illustrations, and that other processes may be added, or existing processes may be removed, modified, or rearranged without departing from the scope and spirit of the present disclosure.

Figure 5:
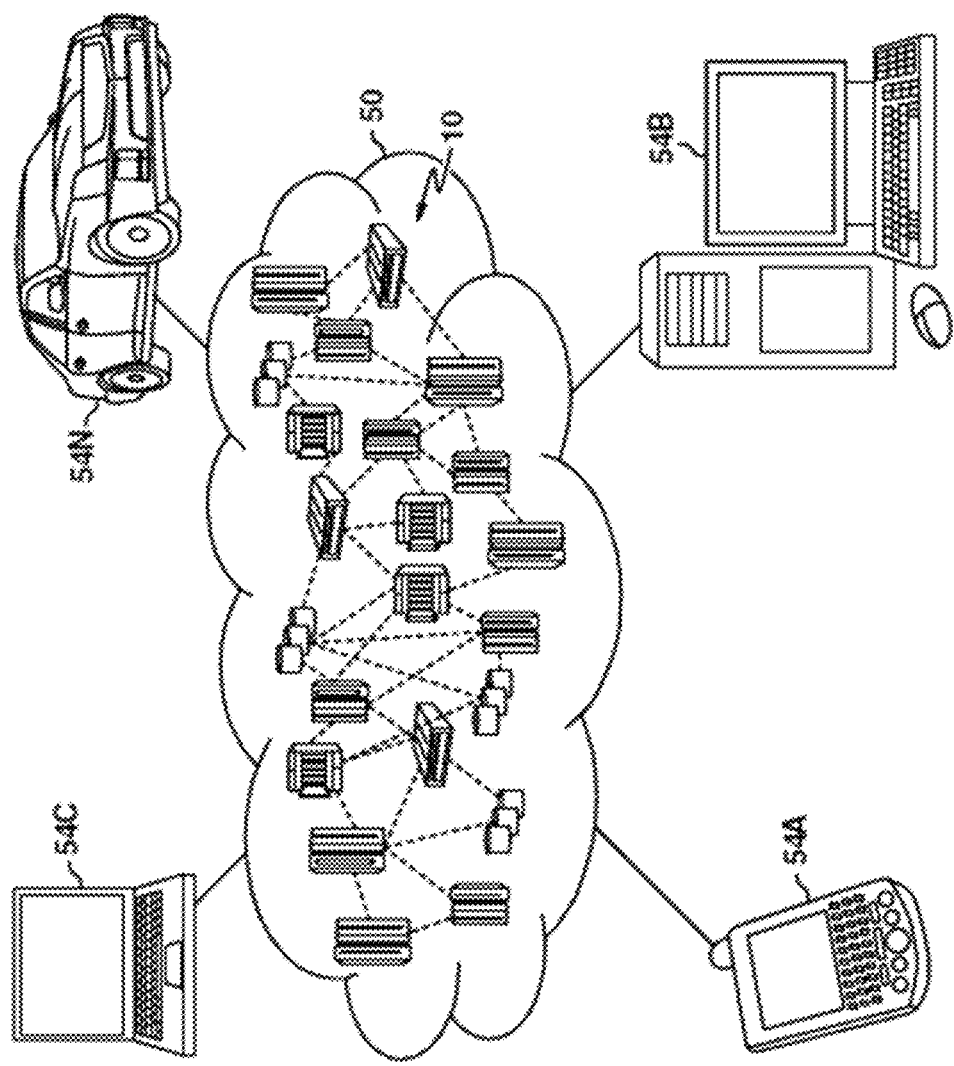
FIG. 5 illustrates a cloud computing environment according to one or more embodiments of the present invention.
Figure 6:
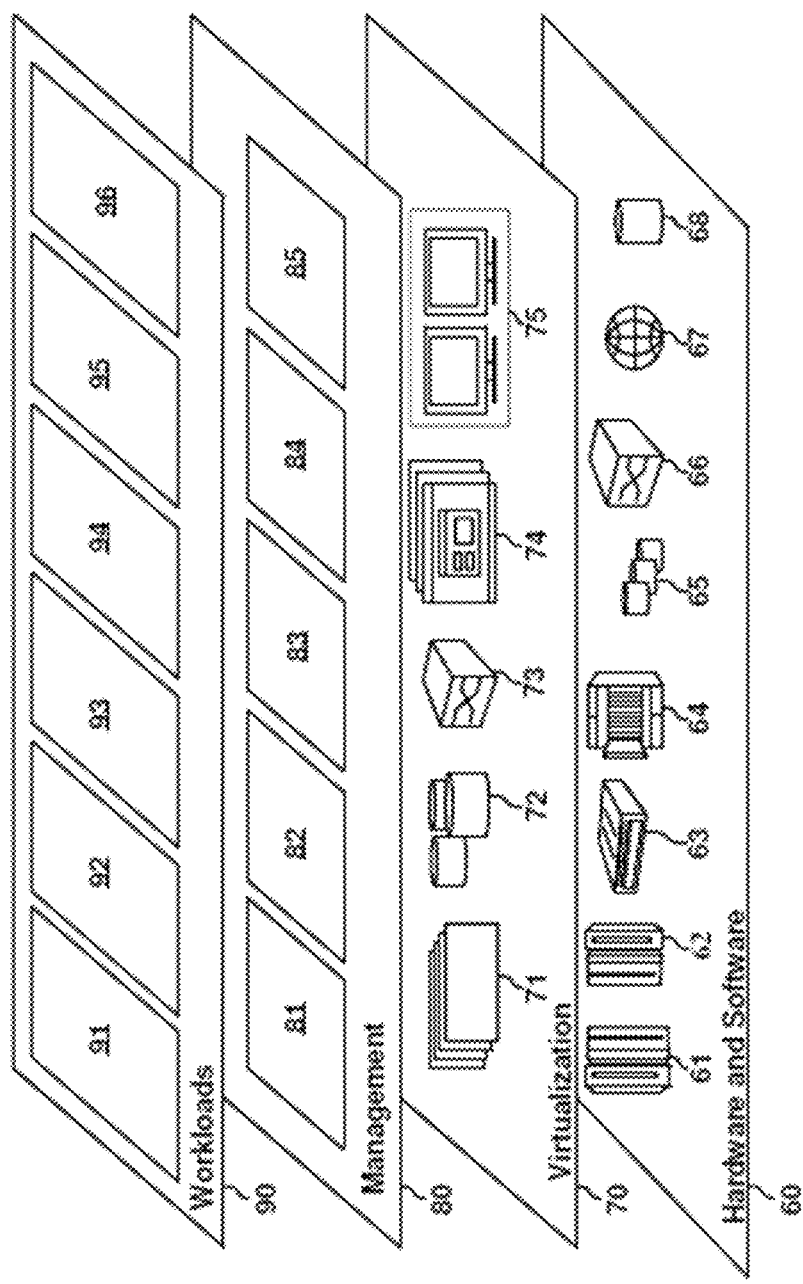
FIG. 6 illustrates abstraction model layers according to one or more embodiments of the present invention.

FIG. 5 depicts a cloud computing environment according to one or more embodiments of the present invention. FIG. 6 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing dynamically optimized stoppage time media content 96.

Figure 7:
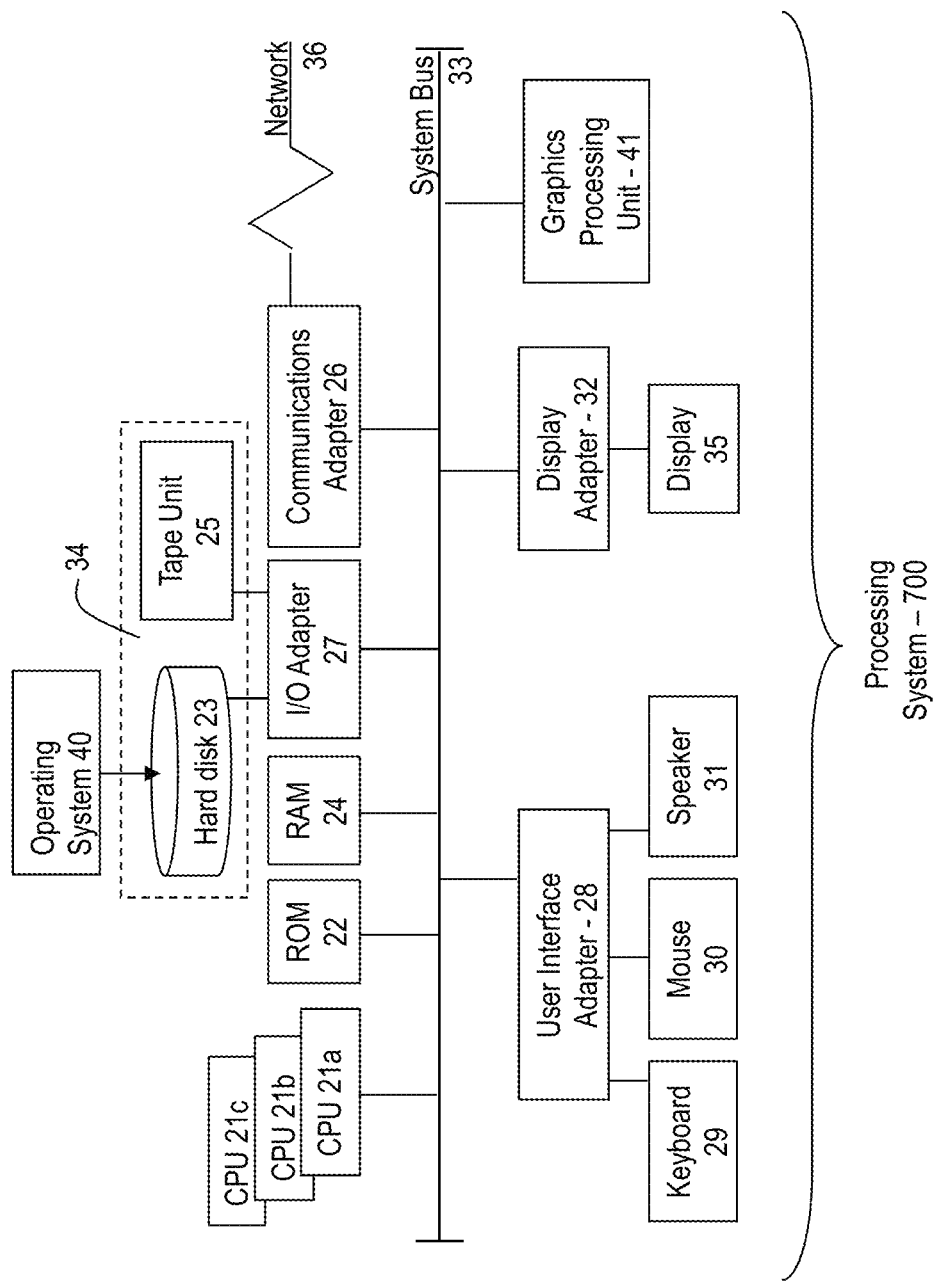
FIG. 7 illustrates a block diagram of a computer system for use in implementing one or more embodiments of the present invention.

FIG. 7 depicts a processing system for implementing one or more embodiments of the present invention;

It is understood that one or more embodiments of the present invention are capable of being implemented in conjunction with any other type of computing environment now known or later developed. For example, FIG. 7 depicts a block diagram of a processing system 700 for implementing the techniques described herein. In accordance with one or more embodiments of the present invention, processing system 100 and/or system 700 can be examples of a cloud computing node 10 of FIG. 5. In the embodiment shown in FIG. 7, processing system 700 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 700.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 700 can be stored in mass storage 34. The RAM 24, ROM 22, and mass storage 34 are examples of memory 19 of the processing system 700. A network adapter 26 interconnects system bus 33 with an outside network 36 enabling the processing system 700 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 700 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 700 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving past performance data;
   collecting a set of observations about a live event;
   generating, based on the past performance data and the set of observations about the live event, a stoppage time prediction;
   generating, based on the stoppage time prediction and a respective duration of each of a plurality of preexisting media files, an optimized content sequence, wherein the optimized content sequence comprises a sequence of one or more media files of the plurality of preexisting media files;
   collecting a second set of observations about the live event at a second time, wherein the second time occurs after the first time;
   generating a revised stoppage time prediction based on the second set of observations about the live event and the past performance data; and
   revising the optimized content sequence based on the revised stoppage time prediction,
   wherein at least a subset of the first set of observations and the second set of observations are based on signals that are received from one or more sensors disposed at a venue hosting the live event and interpreted by a machine learning model.

2. The computer-implemented method of claim 1 further comprising causing the one or more media files to be displayed by a display device.

3. The computer-implemented method of claim 1, wherein generating the optimized content sequence comprises selecting the one or more media files such that a total duration of the one or more media files matches a duration of the stoppage time prediction.

4. The computer-implemented method of claim 1, wherein revising the optimized content sequence comprises adjusting a duration of a selected media file of the one or more media files.

5. The computer-implemented method of claim 4, wherein adjusting the duration of the selected media file comprises adding or removing one or more of a plurality of predetermined segments of the media file.

6. The computer-implemented method of claim 4, wherein adjusting the duration of the selected media file comprises slowing up or speeding down a portion of the selected media file.

7. The computer-implemented method of claim 4, wherein adjusting the duration of the selected media file comprises:
   generating a new frame of the selected media file, wherein the new frame combines a first visual element from a first frame of the selected media file with a second visual element from a second frame of the selected media file; and
   removing the first frame and the second frame from the selected media file.

8. The computer-implemented method of claim 1, wherein generating a stoppage time prediction comprises, using cognitive data analytics to:
   identify one or more stoppage delay paths;
   determine, based on the one or more stoppage delay paths, a critical path; and
   estimating, a duration of the critical path.

9. The computer-implemented method of claim 1 further comprising:
   responsive to determining that a duration of the stoppage time prediction is greater than or equal to a predetermined threshold duration, causing a display device to cease a display of the live event and display the one or more media files; and
   responsive to determining that a duration of the stoppage time prediction is less than the predetermined threshold, refraining from causing the display device to cease the display of the live event.

10. A system comprising:
    a memory having computer readable instructions; and
    one or more processors for executing the computer readable instructions, the computer readable instructions controlling the one or more processors to perform operations comprising:
    receiving past performance data;
    collecting a set of observations about a live event;
    generating, based on the past performance data and the set of observations about the live event, a stoppage time prediction;
    generating, based on the stoppage time prediction and a respective duration of each of a plurality of preexisting media files, an optimized content sequence, wherein the optimized content sequence comprises a sequence of one or more media files of the plurality of preexisting media files;
    collecting a second set of observations about the live event at a second time, wherein the second time occurs after the first time;
    generating a revised stoppage time prediction based on the second set of observations about the live event and the past performance data; and
    revising the optimized content sequence based on the revised stoppage time prediction,
    wherein at least a subset of the first set of observations and the second set of observations are based on signals that are received from one or more sensors disposed at a venue hosting the live event and interpreted by a machine learning model.

11. The system of claim 10 wherein the operations further comprise causing the one or more media files to be displayed by a display device.

12. The system of claim 10, wherein generating the optimized content sequence comprises selecting the one or more media files such that a total duration of the one or more media files matches a duration of the stoppage time prediction.

13. The system of claim 10, wherein revising the optimized content sequence comprises adjusting a duration of a selected media file of the one or more media files.

14. The system of claim 13, wherein adjusting the duration of the selected media file comprises adding or removing one or more of a plurality of predetermined segments of the media file.

15. A computer program product comprising a non-transitory computer readable storage medium having program instructions embodied therewith, the program instructions executable by one or more computer processors to cause the one or more computer processors to perform operations comprising:
    receiving past performance data;
    collecting a set of observations about a live event;
    generating, based on the past performance data and the set of observations about the live event, a stoppage time prediction;
    generating, based on the stoppage time prediction and a respective duration of each of a plurality of preexisting media files, an optimized content sequence, wherein the optimized content sequence comprises a sequence of one or more media files of the plurality of preexisting media files;

collecting a second set of observations about the live event at a second time, wherein the second time occurs after the first time;

generating a revised stoppage time prediction based on the second set of observations about the live event and the past performance data; and revising the optimized content sequence based on the revised stoppage time prediction, wherein at least a subset of the first set of observations and the second set of observations are based on signals that are received from one or more sensors disposed at a venue hosting the live event and interpreted by a machine learning model.

16. The computer program product of claim 15 wherein the operations further comprise causing the one or more media files to be displayed by a display device.

17. The computer program product of claim 15, wherein generating the optimized content sequence comprises selecting the one or more media files such that a total duration of the one or more media files matches a duration of the stoppage time prediction.

* * * * *